(12) United States Patent
Zhang et al.

(10) Patent No.: US 12,415,209 B2
(45) Date of Patent: Sep. 16, 2025

(54) LOW POWER CONSUMPTION ELEVATOR BRAKE

(71) Applicant: Changshu Institute of Technology, Changshu (CN)

(72) Inventors: Fusheng Zhang, Changshu (CN); Lanyu Yang, Changshu (CN); Yang Ge, Changshu (CN); Anbo Jiang, Changshu (CN); Bo Huang, Changshu (CN); Yan Dou, Changshu (CN); Jianxin Ding, Changshu (CN); Fengwang Chen, Changshu (CN); Yun Feng, Changshu (CN); Deren Gu, Changshu (CN); Yuejiang Gu, Changshu (CN)

(73) Assignee: Changshu Institute of Technology, Changshu (CN)

( * ) Notice: Subject to any disclaimer, the term of this patent is extended or adjusted under 35 U.S.C. 154(b) by 425 days.

(21) Appl. No.: 18/129,086

(22) Filed: Mar. 31, 2023

(65) Prior Publication Data

US 2023/0321699 A1 Oct. 12, 2023

(30) Foreign Application Priority Data

Apr. 1, 2022 (CN) .......................... 202210348571.9

(51) Int. Cl.
| | |
|---|---|
| *B08B 13/00* | (2006.01) |
| *B01D 46/00* | (2022.01) |
| *B01D 46/10* | (2006.01) |
| *B01D 46/48* | (2006.01) |
| *B08B 5/04* | (2006.01) |
| *B66B 1/36* | (2006.01) |

(52) U.S. Cl.
CPC ............ *B08B 5/04* (2013.01); *B01D 46/0005* (2013.01); *B01D 46/10* (2013.01); *B01D 46/48* (2013.01); *B01D 2273/30* (2013.01); *B01D 2279/55* (2013.01); *B66B 1/36* (2013.01)

(58) Field of Classification Search
None
See application file for complete search history.

(56) References Cited

U.S. PATENT DOCUMENTS

2018/0065071 A1* 3/2018 Kim ........................ B01D 46/48

FOREIGN PATENT DOCUMENTS

| CN | 104724555 A | * | 6/2015 | ............... B66B 1/18 |
| CN | 107758464 A | * | 3/2018 | ............. B66B 5/021 |
| CN | 215047887 U | * | 12/2021 | |

* cited by examiner

*Primary Examiner* — Eric W Golightly
(74) *Attorney, Agent, or Firm* — Bayramoglu Law Offices L.L.C

(57) ABSTRACT

A low power consumption elevator brake includes the device body and the collection box located on the inner side of the device body. The bottom of the device body is installed with a base, and the side of the base is provided with a collection tank. The top of the device body is connected with a vacuum pipe connected to the collection tank. The top of the vacuum pipe is provided with an interception module. The side of the base is connected with an air outlet pipe connected to the collection tank. The air outlet pipe is provided with an exhaust fan, and the base is provided with a filter module through the collection tank.

7 Claims, 4 Drawing Sheets

LOW POWER CONSUMPTION ELEVATOR BRAKE

CROSS REFERENCE TO THE RELATED APPLICATIONS

This application is based upon and claims priority to Chinese Patent Application No. 202210348571.9, filed on Apr. 1, 2022, the entire contents of which are incorporated herein by reference.

TECHNICAL FIELD

The present invention belongs to the technical field of elevator brake, in particular to a low power consumption elevator brake.

BACKGROUND

Elevator brake is an important safety device for elevator, and its safety and reliability are one of the important factors to ensure the safe operation of elevator. Two-way thrust elevator brake generates two-way electromagnetic thrust when it is powered on, so that the brake mechanism is separated from the rotating part of the motor, and the electromagnetic force disappears when the power is off. Under the action of external brake spring pressure, the friction brake with loss of power is formed. It is mainly matched with the driving motor of the escalator tractor into the escalator electromagnetic braking three-phase asynchronous motor, which is widely used to achieve smooth stop and fast start and safety braking in the event of power failure.

In the process of realizing the present invention, the inventor finds that the technology has at least the following problems: because the elevator brake will be installed in the elevator shaft for use, the dust falling on the elevator shaft wall will enter the elevator brake, which is easy to increase the internal power of the elevator brake.

Therefore, the above problems need to be improved to meet the market demand.

SUMMARY

The purpose of the present invention is to provide a low power consumption elevator brake to solve the problem that the dust falling on the elevator shaft wall in the above background technology will enter the elevator brake and easily cause the increase of the internal power of the elevator brake.

In order to achieve the above purpose, the present invention provides the following technical scheme: a low power consumption elevator brake, including the device body and the collection box located on the inner side of the device body. The bottom of the device body is installed with a base, and the side of the base is provided with a collection tank. The top of the device body is connected with a vacuum pipe connected to the collection tank. The top of the vacuum pipe is provided with an interception module. The side of the base is connected with an air outlet pipe connected to the collection tank. The air outlet pipe is provided with an exhaust fan, and the base is provided with a filter module through the collection tank.

Preferably, the interception module includes a stop bar, which is connected to the top of the vacuum pipe.

By setting the stop bar, the purpose of avoiding large impurities falling into the vacuum pipe is realized.

Preferably, the filter module includes a filter screen, which is detachable and installed in the base. The filter screen fits with the end of the air outlet pipe near the base through the collection tank.

By setting the filter, the purpose of intercepting dust is achieved.

Preferably, the filter screen is installed with the first bolt, and the filter screen is connected to the base through the first bolt.

By setting the first bolt, the purpose of fixing the filter screen is realized.

Preferably, the base is inserted with a collection box through the collection tank, and a handle is installed on one side of the collection box. The collection box is provided with a reminder structure.

By setting the collection box, the purpose of collecting dust is realized.

Preferably, the reminder structure includes a spring connected to the inner bottom wall of the collection box. The top of the spring is equipped with an adapter plate. The inner bottom wall of the collection box is equipped with a switch. The side of the collection box is equipped with a flashing lamp. The flashing lamp is electrically connected to the switch.

By setting switches and flashing lights, the operator is reminded to clean the dust in the collection box in time.

Preferably, a mounting plate is installed on one side of the collection box, and a second bolt is installed on the mounting plate, which is connected to the base through the second bolt.

By setting the mounting plate and the second bolt, the purpose of fixing the position of the collection box is realized.

Compared with the prior art, the advantage of the present invention is:

The low power consumption elevator brake, by starting the pumping pump regularly, makes the dust attached to the body and the dust around the body sucked into the collection tank through the vacuum pipe, and then intercepts the dust by the filter, so as to achieve the effect of dust treatment, which helps to avoid dust entering the body, resulting in a decrease in the heat dissipation performance of the electronic components in the body and an increase in power consumption. In addition, with more and more dust accumulated on the adapter plate, the adapter plate gradually moves down, and finally touches the switch, which makes the flashing light turn on, which achieves the effect of reminding the operator of daily maintenance and helps to clean up the collected dust in time.

BRIEF DESCRIPTION OF THE DRAWINGS

In FIGS. 1-4: 1. Device body; 2. Base; 3. Air outlet pipe; 4. Exhaust fan; 5. Vacuum pipe; 6. Stop bar; 7. Collection tank; 8. Filter screen; 9. First bolt; 10. Collection box; 11. Mounting plate; 12. Second bolt; 13. Handle; 14. Spring; 15. Adapter plate; 16. Switch; 17. Flashing light.

DETAILED DESCRIPTION OF THE EMBODIMENTS

The following is a clear and complete description of the technical scheme in the embodiment of the present invention in combination with the drawings attached to the embodiment of the present invention. Obviously, the described embodiment is only a part of the embodiment of the present invention, but not the whole embodiment. Based on the embodiments of the present invention, all other embodiments obtained by ordinary technical personnel in the field without creative labor are within the scope of protection of the present invention.

Figure 1:
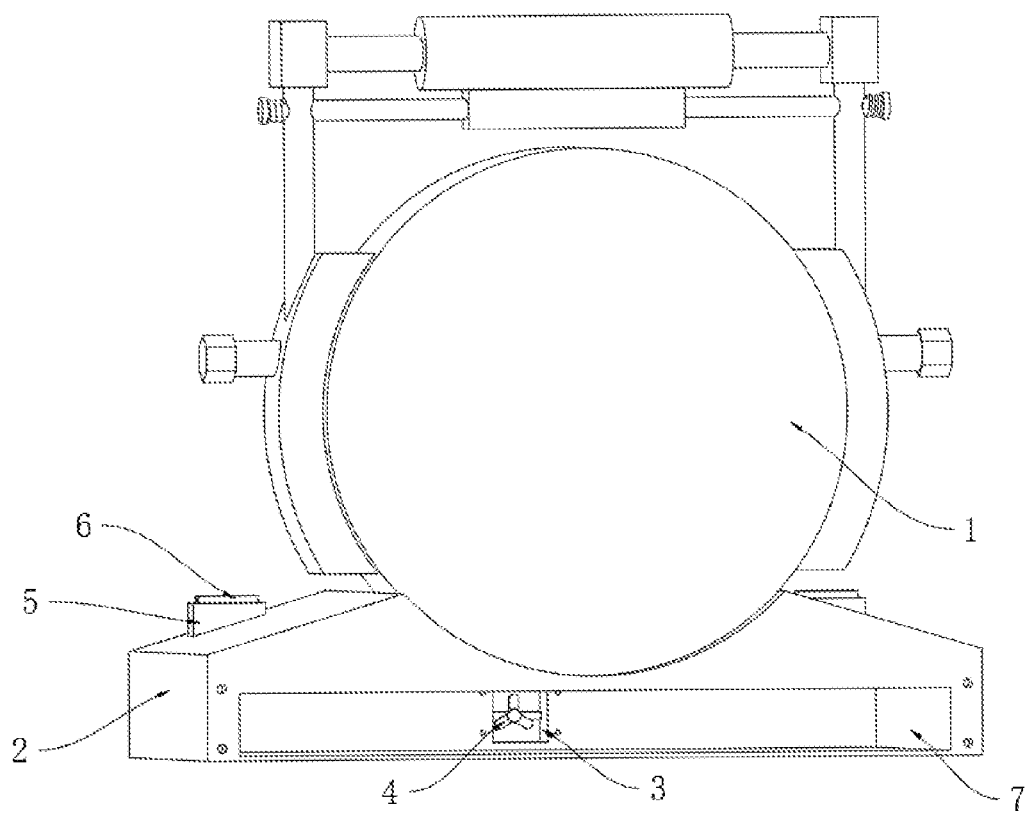
FIG. 1 is a schematic diagram showing the structure of an exhaust fan of the present invention.
Figure 2:
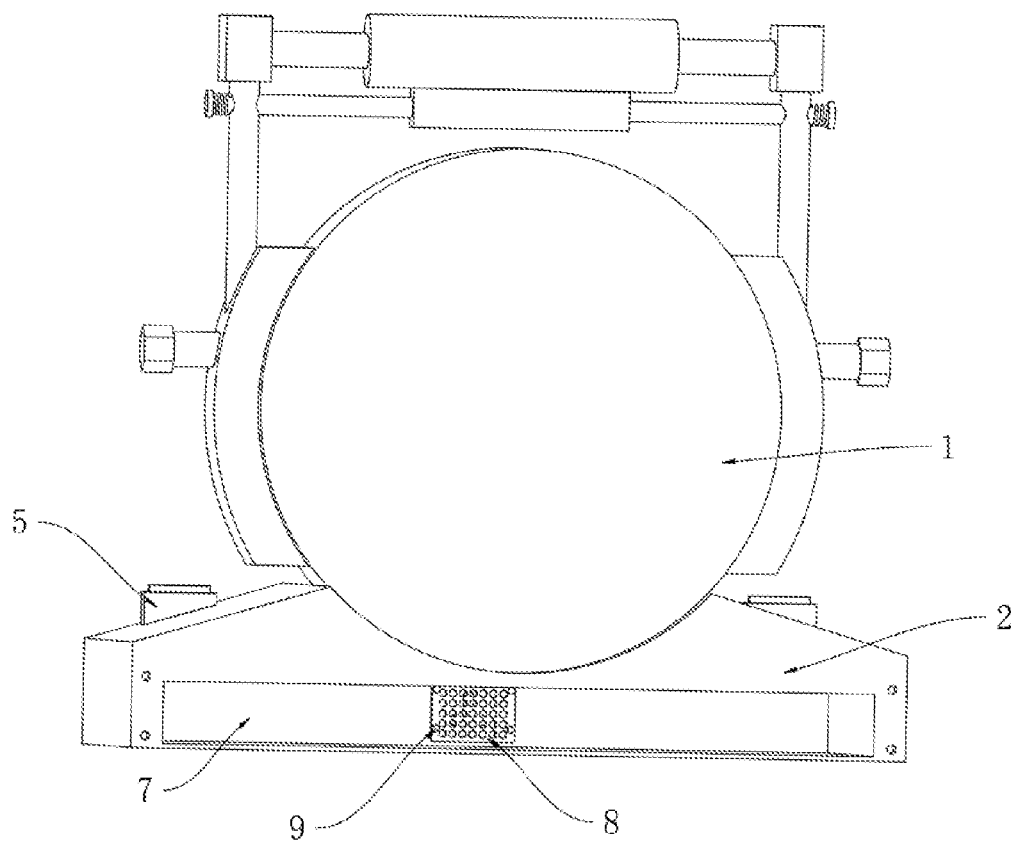
FIG. 2 is a schematic diagram showing the structure of the filter screen of the present invention.
Figure 3:
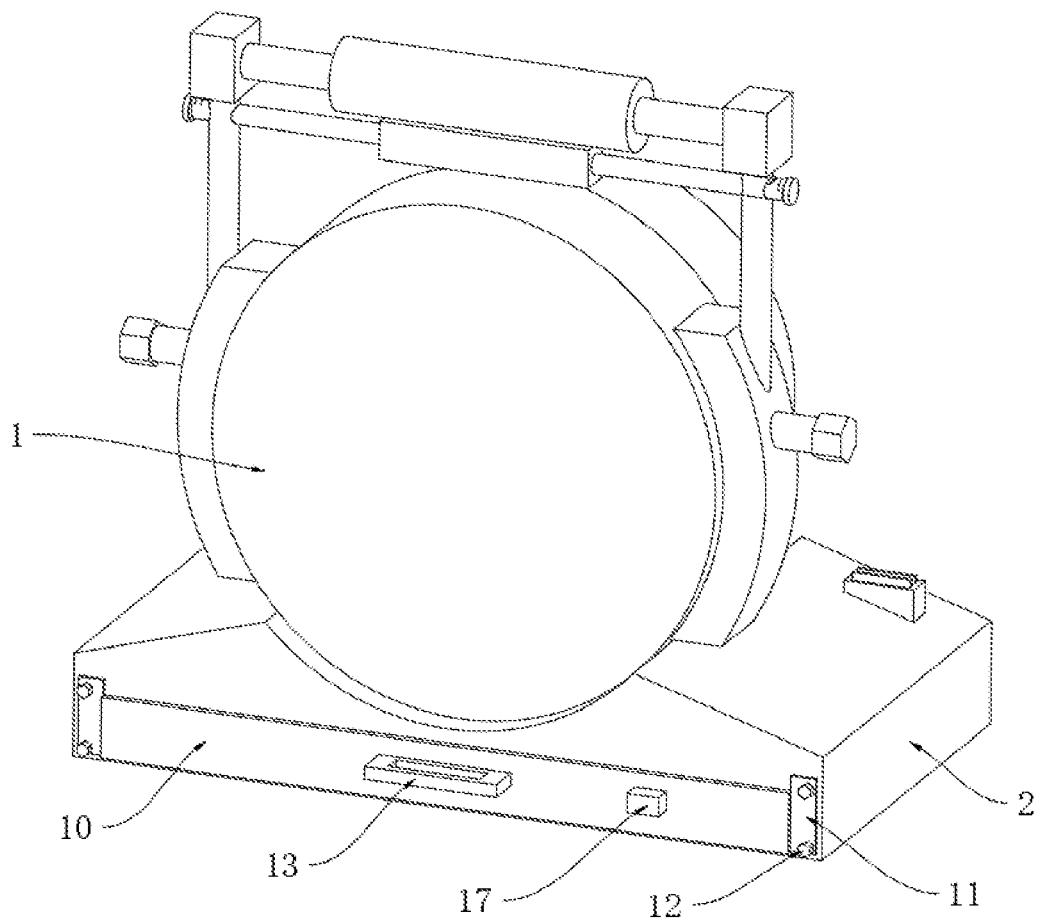
FIG. 3 is a schematic diagram of the structure of the collection box of the present invention.
Figure 4:
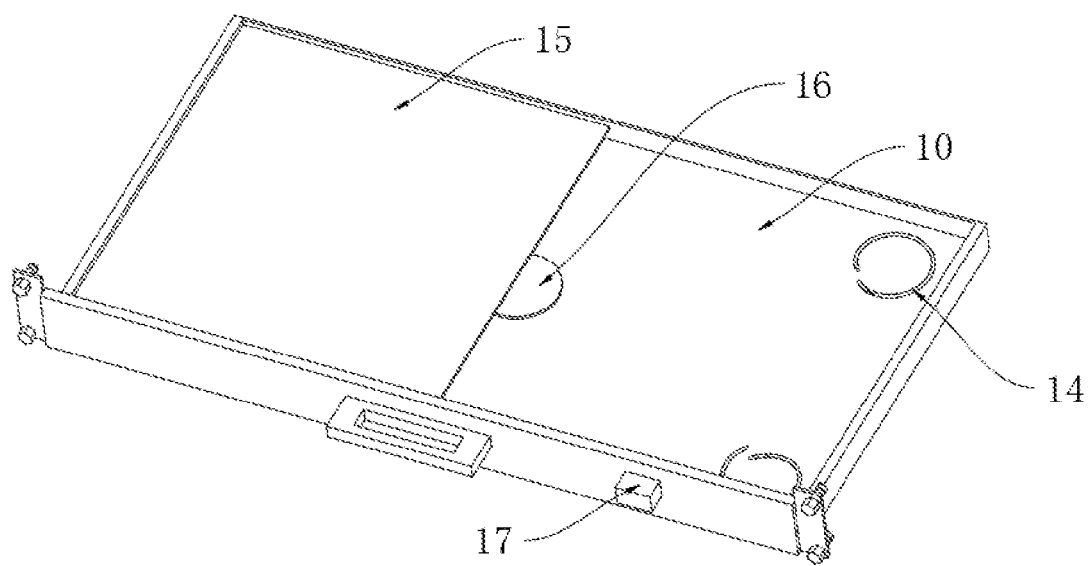
FIG. 4 is a schematic diagram showing the switch structure of the present invention.

Referring to FIGS. 1-4, the present invention provides a technical solution: a low power consumption elevator brake, including a device body 1 and a collection box 10 located inside the device body 1. A base 2 is installed at the bottom of the device body 1, and the base 2 is used to facilitate the installation of the device body 1 in the elevator shaft. A collection tank 7 is provided on one side of the base 2, and the collection tank 7 is used to collect dust. The top of the device body 1 is thoroughly connected with a vacuum pipe 5 connected to the collection tank 7. The dust enters the collection tank 7 through the vacuum pipe 5, and an air outlet pipe 3 connected to the collection tank 7 is connected to one side of the base 2. An exhaust fan 4 is provided in the air outlet pipe 3. The exhaust fan 4 is started, so that the dust attached to the device body 1 and the dust around the device body 1 enter the collection tank 7 through the vacuum pipe 5.

The top end of the vacuum pipe 5 is provided with an interception module, which includes a stop bar 6 connected to the top end of the vacuum pipe 5. The stop bar 6 is used to avoid large impurities entering the vacuum pipe 5 and blocking the vacuum pipe 5 as much as possible.

The base 2 is provided with a filter module through the collection tank 7, which includes a filter screen 8 that can be detachably installed in the base 2. The filter screen 8 is fitted to the end of the air outlet pipe 3 near the base 2 through the collection tank 7, and the filter screen 8 is used to minimize the possibility of dust in the collection tank 7 being re discharged through the air outlet pipe 3. The filter screen 8 is provided with four threaded holes through which four first bolts 9 are threaded, and the base 2 is provided with four thread grooves. The filter screen 8 is threaded to the corresponding thread grooves on the base 2 through the first bolt 9, which is used for fixing and installing the filter screen 8.

The base 2 is movably inserted with a collection box 10 through a collection tank 7, which is used to collect dust in the collection tank 7. A handle 13 is installed on one side of the collection box 10, which is used to facilitate the extraction of the collection box 10 from the collection tank 7. The collection box 10 is provided with a reminder structure, which includes four springs 14 connected to the inner bottom wall of the collection box 10, and an adapter plate 15 is installed between the top ends of the four springs 14. As the dust on the adapter plate 15 accumulates more and more, the spring 14 is compressed under pressure. The inner bottom wall of the collection box 10 is installed with a switch 16, and one side of the collection box 10 is installed with a flashing lamp 17, which is electrically connected to the switch 16. The adapter plate 15 moves downward to contact the switch 16, the flashing light 17 is turned on, thereby achieving the effect of reminding the operator to clean up the dust in a timely manner.

A mounting plate 11 is installed on both sides of the collection box 10, and a second bolt 12 is installed on each mounting plate 11. A corresponding thread groove is provided on one side of the base 2. The mounting plate 11 is threaded to the corresponding thread groove on the base 2 through the second bolt 12. The second bolt 12 can be used to fix the position of the collection box 10, to avoid the separation of the collection box 10 from the collection tank 7 caused by the vibration generated during the operation of the device as much as possible.

Working principle: as shown in FIGS. 1-4, when the device is in use, by regularly starting the exhaust fan 4, the dust attached to the device body 1 and the dust around the device body 1 enter the collection tank 7 through the vacuum pipe 5. The filter screen 8 is used to intercept the dust in the collection tank 7, and finally falls onto the adapter plate 15 in the collection box 10 for collection, thereby achieving the effect of treating the dust around the device body 1, which helps to prevent dust from entering the device body 1. This leads to a decrease in the heat dissipation performance of the electronic components in the body 1, resulting in an increase in power consumption.

As the dust on the adapter plate 15 gradually increases, the adapter plate 15 moves downward under the influence of gravity. Finally, the adapter plate 15 touches the switch 16, causing the flashing light 17 to light up, achieving the effect of reminding operators of routine maintenance.

Notwithstanding that embodiments of the present invention have been shown and described, it is understandable to the ordinary technical person in the field that many variations, modifications, substitutions and variations may be made to these embodiments without deviating from the principle and spirit of the present invention, and that the scope of the present invention is limited by the attached claims and their equivalents.

What is claimed is:

1. An elevator brake, comprising a device body and a collection box located on an inner side of the device body, the brake further comprising a base, a vacuum pipe, and an air outlet pipe,
wherein a bottom of the device body is installed with the base, and a side of the base comprises a collection tank;
a top of the device body is connected with the vacuum pipe, the vacuum pipe connected to the collection tank;
a top of the vacuum pipe comprises an interception module; the side of the base is connected with the air outlet pipe connected to the collection tank; and
the air outlet pipe comprises an exhaust fan, and the base comprises a filter module through the collection tank.

2. The elevator brake according to claim 1, wherein the interception module comprises a stop bar, wherein the stop bar is connected to the top of the vacuum pipe.

3. The elevator brake according to claim 1, wherein the filter module comprises a filter screen, wherein the filter screen is detachable and installed in the base; and the filter screen fits with an end of the air outlet pipe adjacent to the base through the collection tank.

4. The elevator brake according to claim 3, wherein the brake further comprises with a first bolt, and the filter screen is connected to the base through the first bolt.

5. The elevator brake according to claim 1, further comprising a handle wherein the base is inserted with the collection box through the collection tank, and the handle is installed on a side of the collection box; and the collection box comprises a reminder structure.

6. The elevator brake according to claim 5, wherein the reminder structure comprises a spring connected to an inner bottom wall of the collection box; a top of the spring comprises an adapter plate; the inner bottom wall of the collection box comprises a switch; the side of the collection box comprises a flashing lamp; and the flashing lamp is electrically connected to the switch.

7. The elevator brake according to claim 5, wherein further comprising a mounting plate and a second bolt, wherein the mounting plate is installed on the side of the collection box, and the second bolt is installed on the mounting plate, wherein the mounting plate is connected to the base through the second bolt.

* * * * *